United States Patent [19]

Souder et al.

[11] Patent Number: 5,629,029
[45] Date of Patent: May 13, 1997

[54] MOLD DESIGN FOR IN-MOLD DECORATION OF INJECTION MOLDED ARTICLES

[75] Inventors: Blair V. Souder, Willington, Conn.; Crispin M. Belmont, Reading, Pa.

[73] Assignee: United Technologies Automotive Systems, Inc., Detroit, Mich.

[21] Appl. No.: 425,392

[22] Filed: Apr. 20, 1995

[51] Int. Cl.$^6$ ................................................. B29C 45/14
[52] U.S. Cl. .................. 425/112; 264/266; 264/328.8; 425/120; 425/125; 425/129.1; 425/573
[58] Field of Search ........................ 425/112, 120, 425/125, 129.1, 573; 264/266, 328.8

[56] References Cited

U.S. PATENT DOCUMENTS

| | | | |
|---|---|---|---|
| 4,711,621 | 12/1987 | Schomblond | 425/120 |
| 4,740,417 | 4/1988 | Tornero | 264/511 |
| 4,766,025 | 8/1988 | Sanok et al. | 425/120 |
| 4,781,956 | 11/1988 | Zimmermann et al. | 428/165 |
| 4,802,948 | 2/1989 | Zimmermann et al. | 425/412 |
| 5,147,591 | 9/1992 | Yoshida | 264/266 |
| 5,401,449 | 3/1995 | Hill et al. | 264/266 |
| 5,462,421 | 10/1995 | Stein et al. | 425/129.1 |

FOREIGN PATENT DOCUMENTS 2525143  10/1983  France ............................... 264/266

*Primary Examiner*—Robert Davis
*Attorney, Agent, or Firm*—Chilton, Alix & Van Kirk

[57] ABSTRACT

The plastic substrate portion of the part is formed by a first injection of plastic into a mold, so as to adhere to an overlying sheet of coverstock material. A portion of the coverstock is not initially adhered to the substrate. A second injection of plastic forms the undecorated portion of the part, and bonds to the substrate portion to form a unitary plastic panel. In the course of contacting the substrate portion, the plastic from the second injection folds and hides the non-adhered portion of the cover stock, thereby forming a neat, clean split line.

16 Claims, 4 Drawing Sheets

MOLD DESIGN FOR IN-MOLD DECORATION OF INJECTION MOLDED ARTICLES

BACKGROUND OF THE INVENTION

The present invention relates to the decoration of injection molded parts, and particularly the decoration of only a portion of an injection molded panel or the like.

Molded or formed plastic articles are often covered with coverstock such as fabrics and/or foams in applications such as automotive interior trim panels, most notably door interiors. Currently, most of these coverings are applied as a secondary operation after the plastic is formed, using adhesives to bond the coverstock to the plastic.

Manufacturers of automotive trim panels are currently developing methods to insert the coverstock in the injection mold; the heat of the plastic injected into the mold results in a bond between the fabric and the molded plastic. Thus no adhesive or labor-intensive secondary operation is required. The resultant part still requires the trimming and wrapping of the fabric around the rigid plastic, however.

U.S. Pat. No. 4,740,417 discloses one known technique for adhering a porous, foam backed fabric to a thermoplastic substrate, by the use of a vacuum mold. U.S. Pat. Nos. 4,781,956 and 4,802,948 disclose a technique for fabricating an interior trim component for motor vehicles, having cushioning effects in pre-selected areas. None of these patents, however, addresses the particular problem solved by the present invention.

Disadvantages of current in-mold decoration methods for this type of application in addition to the continued need for secondary operations includes the fact that many automotive interior trim parts are not totally covered in fabric. Many parts have sections that are covered in fabric, and others which are simply hard plastic ("class A surface"). To manufacture such parts, the decorated areas of the part needed to be molded separately, covered either in-mold or in a secondary operation with the decorative fabric, and then fastened to the other "class A" parts using mechanical fasteners. Aesthetic considerations dictate that the line formed at the visible interface between the class A surface and decorative material (split or separation line), be clean and of uniform width.

SUMMARY OF THE INVENTION

Accordingly, one object of the present invention is to provide apparatus and method for the fabrication of a finished injection molded part, whereby decorative coverstock is adhered to only a portion of the part, while the entire part is formed within the mold.

Another object is to fabricate such a finished part having a neat, clean separation line at the plastic-coverstock interface, without the need to carefully pre-cut the coverstock before placing it in the mold, or to trim the adhered coverstock after the mold is opened.

A further object is to provide an improved mold having at least one movable plate which is directly actuable by the injected plastic.

In a broad aspect of the method of the invention, the plastic substrate portion of the part is formed by a first injection of plastic into a mold, so as to adhere to an overlying sheet of coverstock material. A portion of the coverstock is not initially adhered to the substrate. A second injection of plastic forms the undecorated portion of the part, and bonds to the substrate portion to form a unitary plastic panel. In the course of contacting the substrate portion, the plastic from the second injection folds and hides the non-adhered portion of the cover stock.

The method for making an injection molded part having decorative material bonded to a portion of the exterior of the part, comprises the steps of selecting a mold including a mold cavity having a first, preferably fixed active surface and a mold core for mating with the mold cavity and having a second, preferably fixed active surface, spaced in juxtaposition to one portion of the first active surface. A plate member supported in the mold core is displaceable away from the mold cavity. The plate member has a third active surface, laterally adjacent to the second active surface and in spaced juxtaposition to another portion of the first active surface, and a fourth active surface, laterally adjacent to the third active surface and in spaced juxtaposition to an additional portion of the first active surface.

A seal is situated between the third and fourth active surfaces, to provide a fluid seal bearing against the other portion of the first active surface. The mold is opened to expose the second, third, and fourth active surfaces. A sheet of decorative material having opposed outer and inner surfaces, is placed between the first active surface and said second, third, and fourth active surfaces. The mold is closed to mate the mold core with the mold cavity. Plastic is injected through the second surface while the seal bears against the first surface, thereby depositing plastic on the second and third active surfaces and against the inner surface of a portion of the decorative material. The plate member is displaced away from the mold cavity, thereby pulling the seal away from the first surface while the mold cavity and mold core are mated. Plastic is injected through the fourth surface, thereby depositing plastic sequentially on the fourth and third active surfaces. The plastic deposited on the third active surface in the second injection step, folds the decorative material on the fourth active surface toward the third active surface, and contacts and bonds with the plastic previously deposited on the third active surface.

Preferably, the plate member is in the form of a plate system which includes a first plate supported in the mold core and defining the third active surface, laterally adjacent to the second active surface and in spaced juxtaposition to the first active surface, except for the seal which bears against the first active surface. The first plate also defines a portion of the fourth active surface. A second plate is supported between the first plate and the mold cavity, defining an extension of the fourth active surface. The second plate is displaced toward the first plate as the mold cavity is closed onto the mold core such that an exposed edge of the second plate shears off a portion of the decorative material against an exposed edge of the first plate as the seal is effectuated. After injection of plastic through the second active surface to bond, the decorative material to a plastic substrate, the first plate is displaced away from the mold cavity. This retracts the seal means away from the first surface while the mold cavity and mold core are mated. Plastic is then injected along the fourth surface of the second and first plate and the third surface of the first plate.

In a broad aspect of the apparatus embodiment of the invention, a closed mold for in-mold decoration of an injection molded part, comprises a mold cavity having a first active surface, a mold core mated with the mold cavity and having a second active surface spaced in juxtaposition to one portion of the first active surface, and a plate member supported in the mold core and displaceable away from the mold cavity. The plate member has a third active surface, laterally adjacent to the second active surface and in spaced juxtaposition to the first active surface, a fourth active surface, laterally adjacent to the third active surface and in spaced juxtaposition to an additional portion of the first active surface, and seal means situated between the third and fourth active surfaces, for providing a fluid seal bearing against the other portion of the first active surface. First means are provided for injecting plastic through the second surface while the seal means bears against the first surface, thereby depositing plastic on the second and third active surfaces. Means are provided for selectively displacing the plate member away from the mold cavity, thereby selectively retracting the seal means away from the first surface while the mold cavity and mold core are mated. Second means for injecting plastic are provided to deposit plastic sequentially on the fourth and third active surfaces, such that the second injection of plastic on the third active surface contacts the plastic previously deposited on the third active surface.

The resultant part has integrated both class A and covered plastic in one process, requiring little or no secondary operation. The class A surface can either partially or entirely surround the fabric covered portion, depending on the design of the plastic part. With the present invention, the width of the separation line between the class A and covered sections can be made quite small (<0.2"). The invention is thus particularly well suited for achieving a clean, neat appearance on highly non-linear split lines. Moreover, the part may be fabricated with several, non-contiguous decorated areas, each with a different material.

BRIEF DESCRIPTION OF THE DRAWINGS

The preferred embodiment of the invention will be described below with reference to the accompanying drawings in which like numerals represent like structures and in which.

DESCRIPTION OF THE PREFERRED EMBODIMENT

Figure 1:
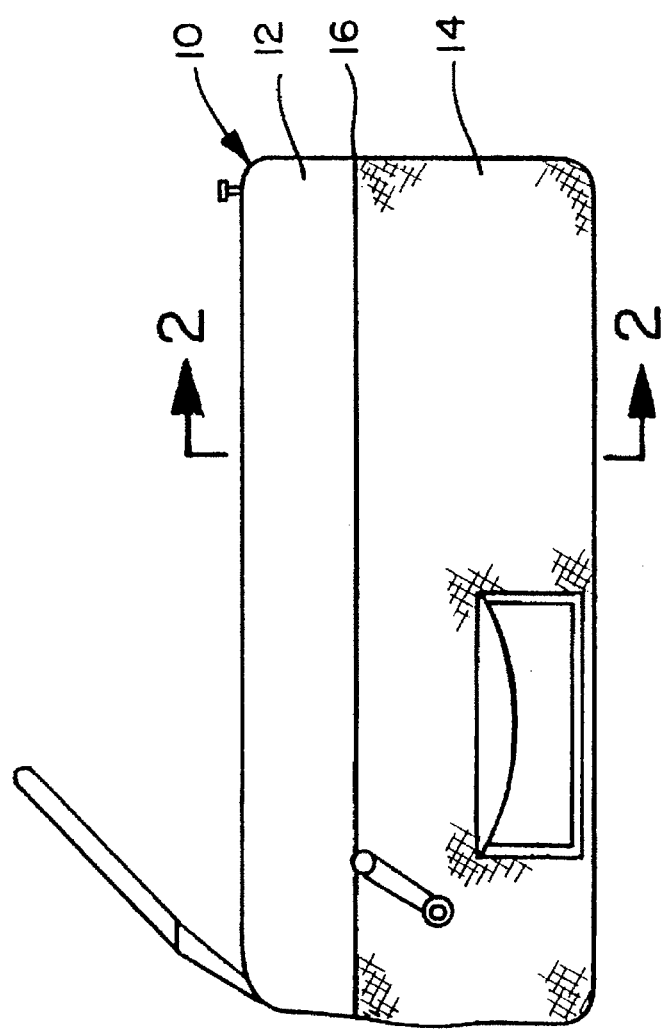
FIG. 1 is a schematic view of an automotive door having a unitary interior panel including an exposed plastic portion and decorative portion of exposed fabric bonded to a plastic substrate, fabricated in accordance with the present invention.

FIG. 1 is a schematic view of an automotive door having a unitary interior panel 10 including an exposed plastic portion 12 (i.e., "class A surface"), and a decorative portion 14 of exposed fabric bonded to a plastic substrate.

Figure 2:
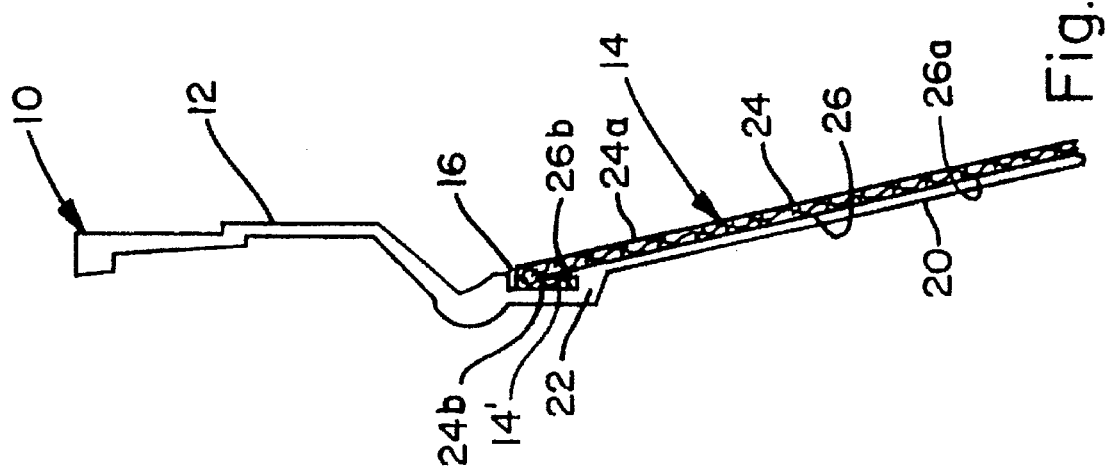
FIG. 2 is a section view of the panel, taken along line 2—2 of FIG. 1.

FIG. 2 is a section view of the panel, illustrating the results achievable in accordance with the apparatus and method of the present invention. In particular, FIG. 2 shows that the panel 10 includes a unitary, rigid plastic base consisting of portions 12 and 20, which are connected together integrally at 22, and that the decorative material 14 is neatly and permanently secured to plastic portions 20 and 22, resulting in a narrow, aesthetically pleasing separation line 16.

Figure 3:
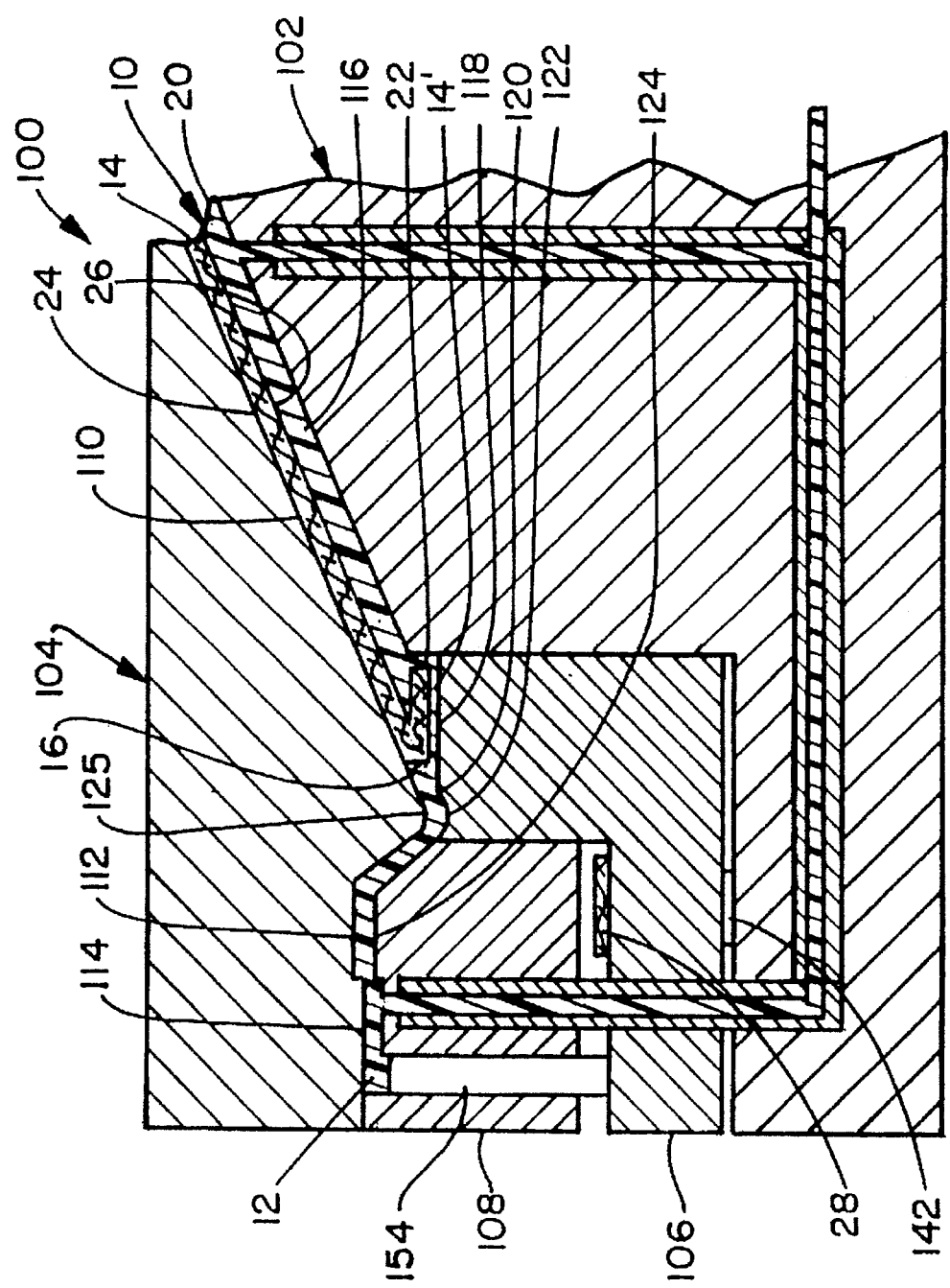
FIG. 3 is a schematic view of the interior of a closed mold in accordance with the present invention, after the panel of FIG. 2 has been fabricated.
Figure 4:
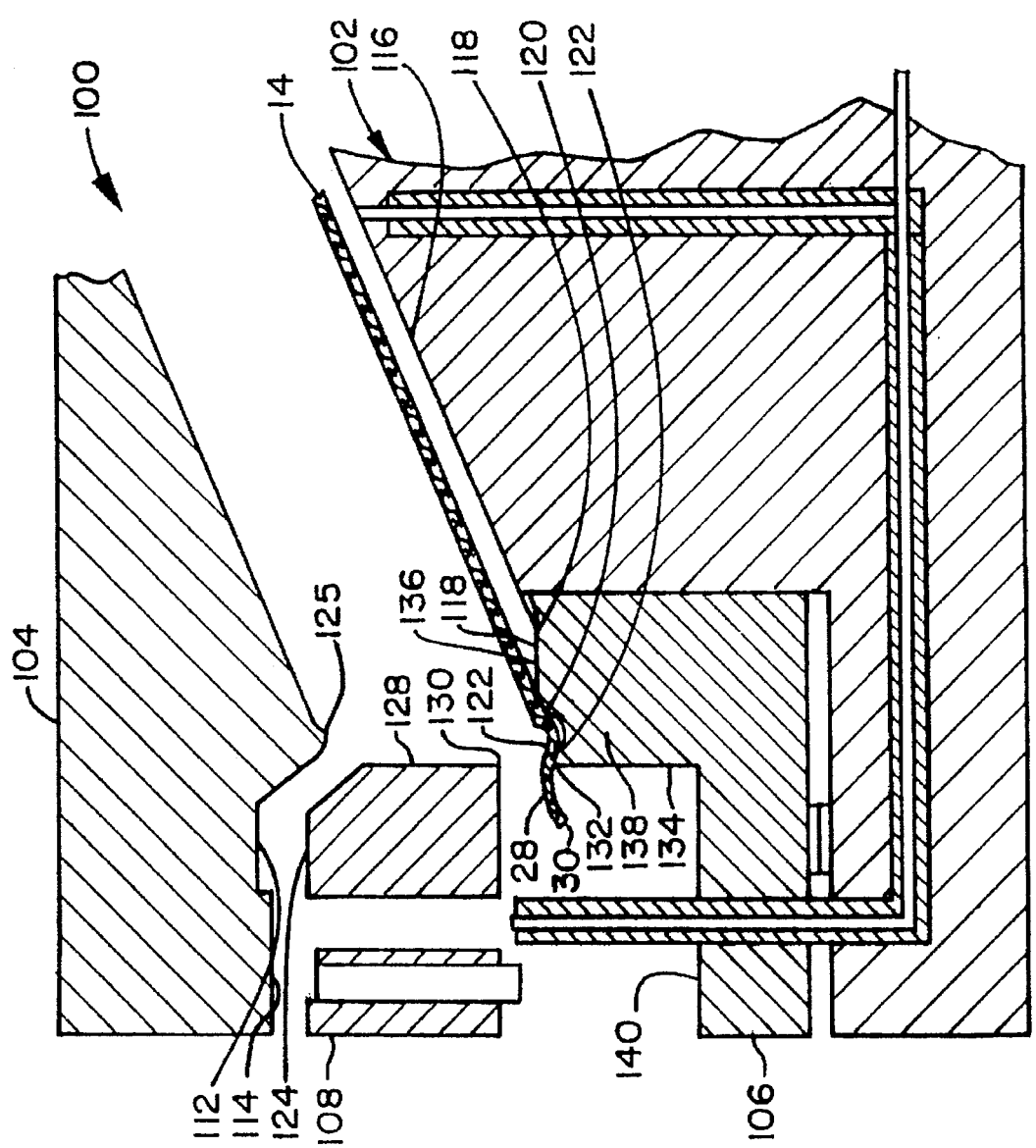
FIG. 4 is a schematic of the mold of FIG. 3, in an open condition after a sheet of decorative coverstock has been placed on the mold core.
Figure 5:
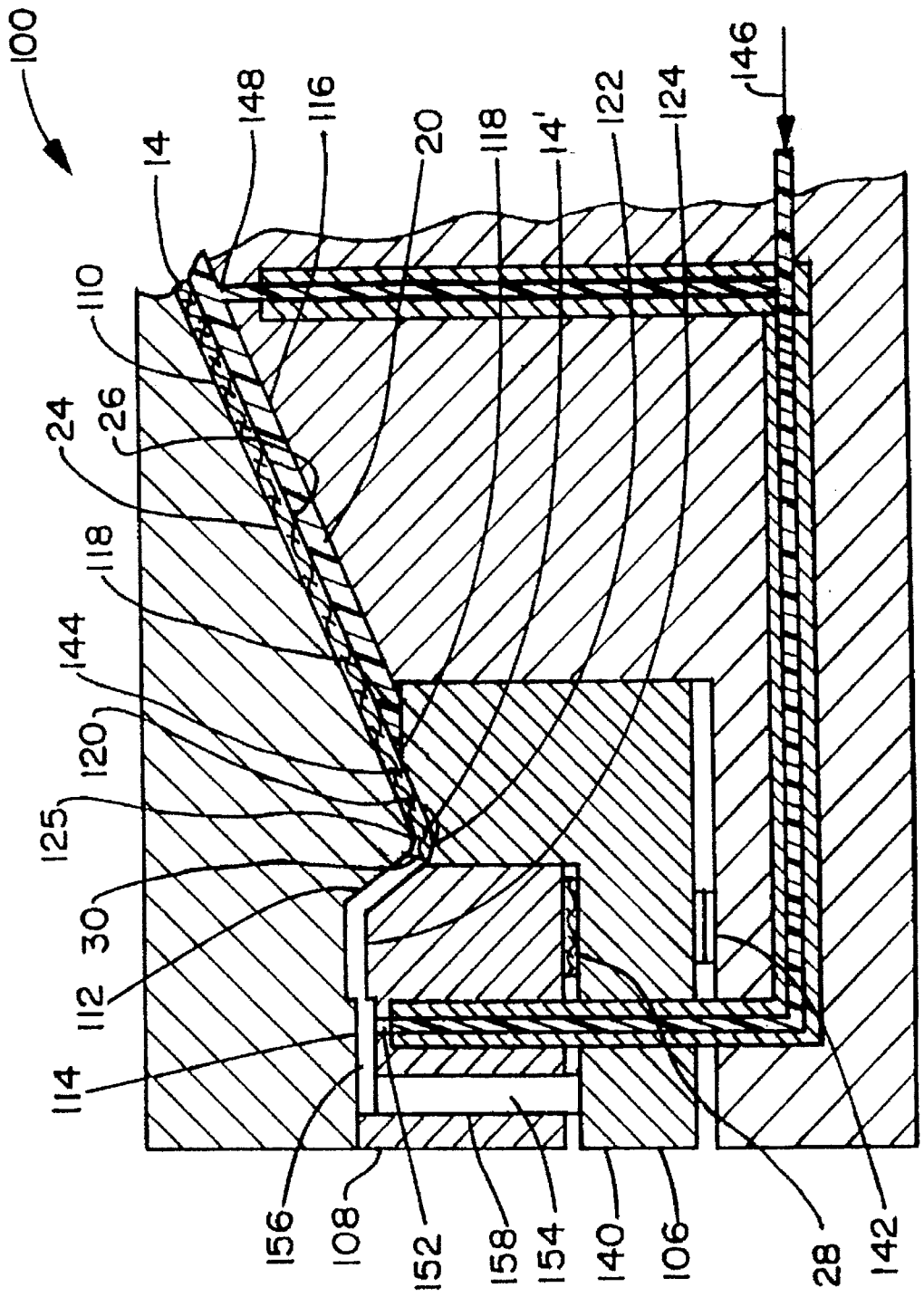
FIG. 5 is a schematic of the mold of FIG. 3, after closure and injection of plastic to form the substrate adhering to the coverstock, but before injection of plastic to form the remainder of the part.

FIGS. 3–5 show various stages during the operation of a mold 100 for the in-mold decoration of a plastic part 10 such as shown in FIGS. 1 and 2, in accordance with the preferred embodiment of the invention. The mold 100 will first be described with reference to FIG. 3, the stage wherein the decoration 14 has been bonded to injection molded plastic substrate 20, just prior to opening of the mold to remove the decorated part. Upon removal of the decorated part, trimming of the plastic 12, 20 is not necessary, if, as described below, direct injection has been made behind the class A surface rather than through a runner. The decorative material 14 requires no trimming at any plastic interface.

The closed mold 100 has, in a conventional manner, a mold core 102 shown for convenience, situated vertically below the mating mold cavity 104, but it can be understood that the mold core and mold cavity could be reversed or provided in different orientations relative to the observer. The important aspect of the condition shown in FIG. 3, is that all the plastic 12, 20 has been injection molded and the decorative material 14 has bonded to only plastic portion 20, before the mold 100 is opened.

This is accomplished in the present invention, by use of at least one movable plate 106, which is displaceable toward and away from the mold 102 and mold cavity 104, in a manner that is coordinated with sequential injection of plastic. Preferably, a second plate 108 is provided, for eliminating a pre-injection processing step by which the decorative material 14 is cut to provide a clean edge to align with a corresponding edge or shoulder in the mold.

In the preferred embodiment, the lower surface of the mold cavity 104 may be considered a first active surface, i.e., a surface against which a plastic or decorative material will be applied. The first active surface typically includes several surface portions such as 110, 112, 114. The mold core 102 defines a second active surface 116 in spaced, juxtaposed relationship to a portion 110 of the first active surface. It should be understood that, in a conventional manner, the mold 100 depicted in FIG. 3 has a border (not shown) at which the perimeters of the mold cavity 104 and the mold core 102 are sealed against each other to prevent the leakage of plastic material upon injection when the mold is closed. In the closed mold, when ready for injection of plastic, surfaces 110 and 116 should be considered as in fixed juxtaposition relative to each other.

The first plate member 106 is nested within the mold core 102, for defining a third active surface 118 adjacent to the second active surface 116. A preferably integral ridge 120 or the like, projects from the third surface toward the first active surface of the mold cavity 104. This ridge establishes a line of demarcation projected on the first active surface to define two portions 112 and 110, to the left and right of the ridge 120 as depicted in the figures. The upper surface of the first plate extends to the left of the ridge 120, thereby defining a fourth active surface 122, which together with surface 118 are in spaced juxtaposition to the first active surface portions 112, 110, respectively.

In the preferred embodiment, second plate 108 is situated between the mold cavity 104 and mold core 102, alongside the first plate 106, thereby defining an extension 124 of the fourth active surface 122 of the first plate.

Plastic of any type conventionally used in the injection molding of plastic parts, has been injected into the mold 100 such that plastic 12, 20 is in direct contact with the second 116, third 118, and fourth 122 active surfaces, as well as the left portion 112 of the first active surface. The right, or main portion 110 of the first active surface is in contact with the decorative material 14 which in turn is bonded to the plastic 20 beneath it. In the region of the ridge 120, above the third active surface 118, the decorative material has been folded back toward the second active surface 116. The fold line 16 is established at another ridge 125 projecting from the first active surface toward the first plate 106, at a location in the preferred embodiment, between the first ridge 120 and the second plate 108, i.e., in confronting relationship to a concave portion of or recess on the fourth active surface 122. This folded strip 14' of decorative material is trapped at the third surface 118 by plastic material 22, thereby establishing a clean separation line at 16 between the decorative material 14 and the plastic, as viewed along the first active surface of the mold cavity, and as viewed from the right in FIG. 2. A continuity in plastic material 22 can be observed as one moves from the second active surface 116, to the third and fourth active surfaces 118, 122.

As seen in FIG. 2 and in the closed mold shown in FIG. 3, a sheet of decorative material 14 having upper and lower sides 24, 26, has one portion 24a of the upper side 24 in contact with the first active surface 110 of the mold cavity 104, whereas the upper side 24b of a second portion 14' of the sheet, has bonded contact with plastic material 22 at the third active surface 118. A first portion 26a of the underside of the sheet is in bonded contact with plastic on the second active surface 116, and the second portion 26b of the underside of the sheet, is in bonded contact with plastic at the third active surface 118.

At the appropriate moment, as determined by conventional timing considerations, the mold 100 is opened and the part 10 is removed. While the mold is open, another integral sheet of decorative material 14 is inserted over the second active surface 116, the third active surface 118, and at least a portion of the fourth active surface 122, as shown in FIG. 4. In the preferred embodiment the fourth plate 108 is supported within, for movement with, the mold cavity 104 toward the mold core 102. This support is such that the fourth active surface 124, on the second plate 108, is spaced from the portion 112, 114 of the first active surface of the mold cavity, according to the desired thickness dimension of the class A portion 12 of the part 10.

The second, or cavity, plate 108 has an exposed side 128 including an exposed edge 130, which upon closing of the mold, cleanly cuts the decorative sheet 14 against the ledge 132 provided by a corresponding exposed side 134 of the first, or core, plate 106. This relationship is conveniently provided by the first plate 106 having a substantially L shape, with the terminus 136 of one leg 136 of the L defining the third 118 and fourth 122 active surfaces of the first plate. The second plate 108 can be substantially rectangular in section and sized to nest between the two legs 140, 138 of the first plate, as viewed in section.

The decorative sheet can be supported in the position shown in FIG. 4 by posts or other support means (not shown) as is conventional in such processes, but according to the preferred embodiment of the present invention, the sheet material need not be positioned with special care or with a need to register edges or the like, owing to the passive cut-off of unnecessary material 28.

As shown in FIG. 5, the cutting action separates a strip 28 from the sheet of decorative material 14, trapping it between the first and second plates, remote from the active surfaces. The closing of the mold cavity does not, however, urge the first plate 106 against the second plate 108 with any degree of force. However, the first plate 106 itself is supported within the mold core 102 by a spring 142 or the like, which biases the first plate 106 toward the mold cavity 104, such that the ridge 120 on the first plate effectuates a seal by forcing the decorative material against the first active surface at 144. At this point in the process, according to the invention, the decorative sheet covers the second active surface 116 of the core and the active surfaces 118, 122 of the first plate 106. It should be appreciated, however, that the remaining edge 30 of the decorative strip at the cut-off, is not intended to be a visible edge of the decorative material in the finished product. In a manner to be described below, the cut edge 30 will eventually be folded back by the action of injection molded plastic so as to form a neat, tight split line from the class A material at the ridge 120.

With the mold in the condition shown in FIG. 5, a source 146 delivers viscous plastic for injection, preferably through a port 148 in the second active surface 116, against the underside 26 of the decorative sheet 14 which is in contact with the first active surface 110. The ridge 120 seals at 144 to prevent this injected plastic from passing beyond the seal such that, at this stage, only that portion 20 of the finished part 10 which is intended to carry the decorative material, has been injected. This substrate covers the second and third active surfaces 116, 118. The portion 14' of the sheet material extends freely to the left of the seal means 120.

After the injection has occurred through the first port 148, the ridge, or seal means 120, is displaced away from the first active surface of the mold cavity, thereby affording fluid communication between the fourth active surface 122 and the plastic that is in contact with the third active surface 118. In particular, this is accomplished by the displacement of the first plate 106 to move the third active surface 118 away from the plastic that was initially injected thereon, creating a space which when filled with additional plastic material, will bond to the plastic material 20 introduced from the first port 148. This condition, shown in FIG. 3, is achieved by introducing additional plastic material through another port 152, preferably in the fourth active surface 124, preferably of the second plate 108. The plate 106 can be retracted by known means, e.g., hydraulically or mechanically.

This second injection step provides three important effects. First, the plastic for the class A portion 12 of part 10 is injected between the fourth active surface 122, 124 and the first active surface 112, 114. Secondly, the free portion 14' of the sheet on the fourth surface 122, is folded back toward the second active surface 116 as the plastic moves sequentially across the fourth 122 and third 118 active surfaces. The presence of the edge 125 on the first active surface, establishes a clean, neat, interface between plastic and decorative material, providing a very aesthetically pleasing separation line 16 in the final product 10. Third, upon folding the decorative material, the plastic from the second port 152 continues across the third active surface 118, thereby contacting and bonding at 22 with the plastic material 20 from the first injection port 148. Cooperation of the edge 125 and recess at 122, facilitates proper folding of the strip 28 of the decorative material, into a substantially horizontal orientation as shown in FIG. 3, rather than buckling against the flow of the plastic injected at port 152. A contact width of one quarter inch at 22 is sufficient to achieve, upon curing, a rigidity which permits handling and installation of the entire decorated panel 10, as a unitary part.

Thus, although the decorated panel 10 was fabricated in two injection steps, both steps were accomplished by a continuous sequence in a single mold, after only one closure, and no manual steps or machine fastening steps were required to achieve the unitary characteristics of the decorated panel.

In the sequence between FIGS. 5 and 3, the sealing means or member 120 is displaced away from the first active surface, by movement of the first plate 106 relative to the second plate 108, and more particularly, by the actuation of a piston 154 which extends between the second plate 108 and the first plate 106, to act against the bias of the spring member 142 situated between the first plate 106 and the mold core 102.

In another novel aspect of the present invention shown in FIG. 5, this piston 154 is passively actuated by the injection of plastic material into the mold, particularly from the second port 152 into the space 156 between the fourth active surface 122, 124 and the other active surface 112, 114 on the mold cavity. A substantially cylindrical piston chamber 158 extends from the fourth surface 124, on the second plate 108, through the second plate such that a cylindrical piston 154 situated in the chamber, can extend therethrough into contact with one leg 140 of the first plate. The high pressure associated with the injection of plastic through the second port, acts through the chamber 158 to urge the piston downward, overcoming the bias of spring 142. The mold then resembles the condition shown in FIG. 3.

This feature of the invention, whereby a plate can be moved within a closed mold, as a result of the injected plastic acting through a piston chamber associated with the plate, can be implemented in embodiments where parts are formed in either one or a plurality of steps, with or without in-mold decoration.

The mold 100 with two plates 106, 108 and associated method described above, best achieve the objectives of the present invention. If, however, equipment or operators are available upstream of the open mold (FIG. 4), for accurately cutting the edge 30 of the decorative material such that over the full length of such edge a margin of a predetermined range, e.g., 1/16–1/2", can be maintained between the cut edge 30 and the seal ridge 120 when the precut material is placed within the open mold, then an alternative embodiment of the invention can be implemented with only one plate 106. With such plate, the third active surface 118 and seal member 120 could be as described with respect to FIGS. 3–5, whereas the fourth active surface 122 is modified such that the required dimension of the space 156 between the fourth active surface 122 and the other portion 112, 114 of the first active surface, would be available after the first plate 106 is moved away from the first active surface. In this manner, no passive cutting of a strip 28 would be achieved, but because the sheet material edge would cover the seal ridge 120 without extending beyond it more than a predetermined distance, the second injection step via port 152 would achieve the same three important effects as in the previously described embodiment. Thus, similar appearance and rigidity of the final product can be achieved.

We claim:

1. A closed mold adapted for in-mold decoration of an injection molded part, comprising:
   a mold cavity having a first active surface;
   a mold core mated with said mold cavity and having a second active surface, spaced in fixed juxtaposition to one portion of said first active surface;
   a sheet of decorative material situated between the first and second active surfaces of the mold cavity and mold core, respectively;
   a plate member supported in said mold core and displaceable away from said mold cavity, said plate member having,
   a third active surface, laterally adjacent to said second active surface and in spaced juxtaposition to another portion of said first active surface,
   a fourth active surface, laterally adjacent to said third active surface and in spaced juxtaposition to an additional portion of said first active surface,
   seal means situated between said third and fourth active surfaces and contacting the sheet to provide a fluid seal bearing against said another portion of the first active surface;
   first means for injecting plastic, through said second surface while said seal bears against said another portion of the first active surface, to deposit plastic on said second and third active surfaces;
   means for displacing said plate member away from said mold cavity, thereby retracting said seal means away from said first active surface while the mold cavity and mold core are mated;
   second means for injecting plastic, through said fourth active surface, thereby depositing plastic sequentially on said fourth and third active surfaces, such that the plastic deposited on said third active surface by the second means for injecting plastic, contacts the plastic deposited on the third active surface by the first means for injecting plastic.

2. The mold of claim 1, wherein the seal means is defined by a ridge integrally formed on the plate member.

3. The mold of claim 1, wherein the first active surface includes a protruding edge, said edge confronting a recess in the plate member between said seal means and said second means for injecting plastic.

4. A mold for in-mold decoration of an injection molded part, comprising:
   a mold cavity having a first active surface;
   a mold core mated with said mold cavity and having a second, relatively fixed active surface, spaced in juxtaposition to one portion of said first active surface;
   a first plate supported in said mold core and having a third active surface, laterally adjacent to said second active surface and in spaced juxtaposition to another portion of said first active surface, and seal means which bears against said another portion of the first active surface;
   a second plate supported between said first plate and said mold cavity, said second plate having a fourth active surface, in spaced juxtaposition to an additional portion of said first active surface;
   means for injecting plastic through said second surface while said seal means bears against said another portion of the first surface;
   means for selectively displacing said first plate away from said mold cavity, thereby selectively retracting said seal means away from said first surface and providing a flow path between said fourth and third active surfaces while the mold cavity and mold core are mated;
   means for injecting plastic through said fourth surface onto said third active surface while said first plate is displaced.

5. The mold of claim 4, wherein the means for selectively displacing said first plate includes,
   a piston extending between the first and second plates, and
   a piston chamber fluidly connecting said piston to the second means for injecting plastic such that said piston is passively actuated to displace said first plate relative to said second plate and away from said mold cavity, by a flow of plastic from said second means for injecting to said piston chamber.

6. The mold of claim 4, wherein the seal means is defined by a ridge integrally formed on the first plate.

7. The mold of claim 6, wherein the first active surface includes a protruding edge, said edge confronting a recess in the first plate between said seal means and said fourth active surface.

8. The mold of claim 4, wherein means are provided between the mold core and the first plate, for biasing the first plate toward the mold cavity.

9. The mold of claim 8, wherein the second plate is nested in the first plate, and said means for selectively displacing the first plate, acts between the first and second plates, against the bias of said means for biasing.

10. The mold of claim 9, wherein the means for selectively displacing said first plate includes, a piston extending between the first and second plates, and a piston chamber fluidly connecting said piston to the second means for injecting plastic such that said piston is passively actuated to displace said first plate relative to said second plate and away from said mold cavity, by a flow of plastic from said second means for injecting to said piston chamber.

11. The mold of claim 4, including in combination, an integral sheet of decorative material having outer and inner surfaces and being folded along a fold line such that the outer surface on one side of the fold line is in contact with said first active surface, the outer surface on the other side of the fold line is bonded to plastic deposited on the third active surface by the second means for injecting plastic, the inner surface on said one side of the fold line is in bonded contact with plastic deposited by the first means for injecting plastic, and the inner surface on said other side of the fold line is in contact with the plastic deposited by the first means for injecting plastic.

12. The mold of claim 11, wherein the mold includes at a location remote from said active surfaces, a strip of decorative material sheared from the integral sheet by displacement of the second plate relative to the first plate.

13. A closed mold adapted for in-mold decoration of an injection molded part, comprising:

a mold cavity having a first active surface;

a mold core mated with said mold cavity and having a second active surface, spaced in fixed juxtaposition to one portion of said first active surface;

a plate member supported in said mold core and displaceable away from said mold cavity, said plate member having, a third active surface, laterally adjacent to said second active surface and in spaced juxtaposition to another portion of said first active surface, a fourth active surface, laterally adjacent to said third active surface and in spaced juxtaposition to an additional portion of said first active surface, seal means situated between said third and fourth active surfaces and biased toward said another portion of the first active surface;

first means for injecting plastic, through said second surface while said seal means bears against said another portion of the first active surface, to deposit plastic on said second and third active surfaces;

means for displacing said plate member away from said mold cavity, thereby retracting said seal means away from said first active surface while the mold cavity and mold core are mated;

second means for injecting plastic, through said fourth active surface, thereby depositing plastic sequentially on said fourth and third active surfaces, such that the plastic deposited on said third active surface by the second means for injecting plastic, contacts the plastic deposited on the third active surface by the first means for injecting plastic.

14. The mold of claim 13, including in combination an integral sheet of decorative material having outer and inner surfaces and being folded along a fold line such that the outer surface on one side of the fold line is in contact with said first active surface, the outer surface on the other side of the fold line is bonded to plastic deposited on the third active surface by the second means for injecting plastic, the inner surface on said one side of the fold line is in bonded contact with plastic deposited by the first means for injecting plastic, and the inner surface on said other side of the fold line is in contact with the plastic deposited by the first means for injecting plastic.

15. The mold of claim 14, wherein the seal means is defined by a ridge integrally formed on the plate member, and the first active surface includes a protruding edge, said edge confronting a recess in the plate member between said seal means and said second means for injecting plastic.

16. The mold of claim 13, wherein the first active surface includes a protruding edge, said edge confronting a recess in the plate member between said ridge and said second means for injecting plastic.

* * * * *